Onions & Roberts.
Lamp-Chimney.
N° 76239. Patented Mar. 31, 1868.

Witnesses.                                   Inventors.
W. C. Ashkettle                              W. Onions
J. A. Fraser                                 H. Roberts
                                    per Munn & Co
                                         Attorneys

United States Patent Office.

WILLIAM ONIONS AND HENRY ROBERTS, OF ST. LOUIS, MISSOURI.

Letters Patent No. 76,239, dated March 31, 1868.

IMPROVEMENT IN LAMP-CHIMNEYS.

The Schedule referred to in these Letters Patent and making part of the same.

TO ALL WHOM IT MAY CONCERN:

Be it known that we, WILLIAM ONIONS and HENRY ROBERTS, of St. Louis, in the county of St. Louis, and State of Missouri, have invented a new and improved Lamp-Chimney; and we do hereby declare that the following is a full, clear, and exact description thereof, which will enable those skilled-in the art to make and use the same, reference being had to the accompanying drawings, forming part of this specification.

This invention relates to a new and improved lamp-chimney, of that class which is composed of glass and metal, a glass lower portion and a metal upper portion.

The invention consists in a new and improved means for securing the metal to the glass portion of the chimney, whereby the latter is prevented from breaking under the expansion of the former—a contingency of frequent occurrence with chimneys of this class. In the accompanying sheet of drawings—

Figure 1:
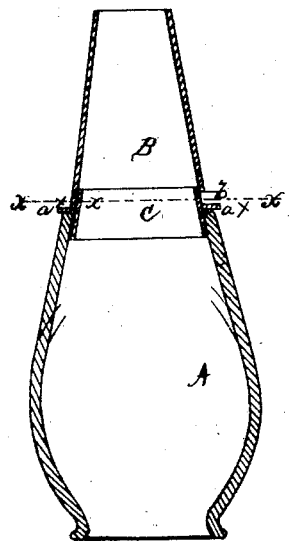

Figure 1 is a vertical central section of our invention.

Figure 2:
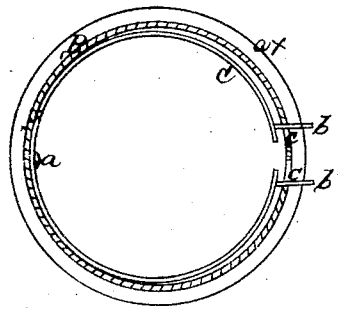

Figure 2, an enlarged horizontal section of the same, taken in the line $x\ x$, fig. 1.

Similar letters of reference indicate corresponding parts.

A represents the lower glass portion of the lamp-chimney, and B the upper metal portion, the latter being of conical form, and having its lower and larger end equal in diameter to the upper and smaller end of the glass portion A. Within the lower part of the metal portion B of the chimney, there is attached, by a rivet, $a$, metal elastic band C, the ends of which are free, or not attached, and each provided with a pin, $b$, which extends through oblong slots $c$, in the lower part of B.

This band C, by its own elasticity, has a tendency to remain in an expanded state, and said band is of a conical form, and extends down below the lower end of B, so that it may fit within the upper end of the glass portion A, the band being inserted in the chimney by pressing the pins $b\ b$ towards each other, and thereby compressing or diminishing the diameter of the band, so that it may be fitted in the upper end of A, and when the pins $b\ b$ are released, the band allowed to expand by its own elasticity, and its conical side allowed to fit snugly against the inner side of the glass portion A, as shown in fig. 1. The band forms a secure fastening for securing B to A, the lower end of B being provided with a flange, $a^\times$, to rest on the top of A.

In order to detach the metal portion, B, from A, all that is required is simply to press the pins $b\ b$ towards each other, so as to contract or diminish the diameter of the band C, and B may be removed from A without any difficulty whatever.

This band C, it will be seen, may expand and contract freely, and hence there is no danger of the glass portion A cracking under the expansion of itself, or the metal portion B from the heat of the burner, a contingency of frequent occurrence with the ordinary combined metal and glass lamp-chimneys, owing to the expansion of the same from the heat of the burner, the metallic portion being attached to the glass portion by a rigid connection, and the difference in the degree of expansion between the glass and metal favoring the result.

We claim as new, and desire to secure by Letters Patent—

The elastic band C, attached to the lower part of the upper metallic portion B of the lamp-chimney, and extending down below the same, to fit into the upper end of the glass portion A of the chimney, substantially in the manner as and for the purpose set forth.

WILLIAM ONIONS,
HENRY ROBERTS.

Witnesses:
FERD. STROOP,
CHAS. C. OBERT.